United States Patent
Vallejo et al.

(10) Patent No.: US 11,253,808 B2
(45) Date of Patent: Feb. 22, 2022

(54) BYPASS CYCLONE FILTER

(71) Applicant: Samsung Electronics Co., Ltd., Suwon-si (KR)

(72) Inventors: Alejandro E. Vallejo, Oakley, CA (US); Junghwa Cho, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 16/238,276

(22) Filed: Jan. 2, 2019

(65) Prior Publication Data
US 2020/0206672 A1  Jul. 2, 2020

(51) Int. Cl.
*B01D 50/00* (2006.01)
*B01D 46/48* (2006.01)
*B01D 45/14* (2006.01)

(52) U.S. Cl.
CPC ........... *B01D 50/002* (2013.01); *B01D 45/14* (2013.01); *B01D 46/48* (2013.01); *B01D 2279/55* (2013.01)

(58) Field of Classification Search
CPC ...... B01D 50/002; B01D 46/48; B01D 45/14; B01D 2279/55
See application file for complete search history.

(56) References Cited

U.S. PATENT DOCUMENTS

| | | | |
|---|---|---|---|
| 8,176,597 B2 | 5/2012 | Stein et al. | |
| 2008/0190080 A1 | 8/2008 | Oh et al. | |
| 2008/0230446 A1 | 9/2008 | Bertram et al. | |
| 2009/0056290 A1 | 3/2009 | Oh et al. | |
| 2009/0265883 A1 | 10/2009 | Reed et al. | |
| 2013/0219843 A1* | 8/2013 | Barker | B01D 45/16 55/423 |
| 2017/0245705 A1 | 8/2017 | Son et al. | |
| 2018/0353032 A1 | 12/2018 | Conrad et al. | |

FOREIGN PATENT DOCUMENTS

| | | |
|---|---|---|
| GB | 2524537 A | 9/2015 |
| JP | 2011142936 A | 7/2011 |
| KR | 0593619 B1 | 6/2006 |
| KR | 10-0607440 B1 | 7/2006 |
| KR | 1174915 B1 | 8/2012 |
| KR | 10-1641256 B1 | 7/2016 |
| KR | 10-1730767 B1 | 4/2017 |

OTHER PUBLICATIONS

International Search Report and Written Opinion dated Apr. 23, 2020 for International Application PCT/KR2020/000042 from Korean Intellectual Property Office, pp. 1-10, Republic of Korea.
Extended European Search Report dated Oct. 8, 2021 for European Application No. 20736043.9 from European Patent Office, pp. 1-6, Munich Germany.

* cited by examiner

*Primary Examiner* — Robert Clemente
(74) *Attorney, Agent, or Firm* — Sherman IP LLP; Kenneth L. Sherman; Steven Laut

(57) ABSTRACT

A cyclone filter includes an air cyclone. A cyclone chamber is connected to the air cyclone. The cyclone chamber includes a cyclone constriction path and a crossflow filter. A return path portion is connected externally to the cyclone chamber.

20 Claims, 11 Drawing Sheets

BYPASS CYCLONE FILTER

TECHNICAL FIELD

One or more embodiments relate generally to cyclone separation and filtration systems, and in particular, to filament bypass cyclone separation systems and filters.

BACKGROUND

Air cyclone separation and filtration systems have been in use for over a century and have seen numerous different applications such as consumer vacuum cleaners. Air cyclone separation and filtration systems generally work well with small particles that are spherical, or near net spherical.

SUMMARY

One or more embodiments relate to filament bypass cyclone separation devices, systems and filters. In one embodiment, a cyclone filter includes an air cyclone generator, and a cyclone chamber connected to the air cyclone generator. The cyclone chamber includes a cyclone constriction path and a crossflow filter. A return path portion is connected externally to the cyclone chamber.

In another embodiment, a cyclone device includes an air cyclone generator. The air cyclone generator includes at least two sets of openings. A cyclone chamber is connected to the air cyclone generator. The cyclone chamber includes a cyclone constriction path, a crossflow filter and a cyclone exterior barrier.

In one embodiment, a method for filtering filament particles with a cyclone filter includes forming a cyclone airflow within a cyclone chamber of the cyclone filter. The method further includes moving, with the cyclone airflow, filament particles through a crossflow filter bypass opening. The filament particles are filtered from the cyclone airflow using a crossflow filter within the cyclone chamber.

These and other features, aspects and advantages of the one or more embodiments will become understood with reference to the following description, appended claims and accompanying figures.

DETAILED DESCRIPTION

Figure 1A:
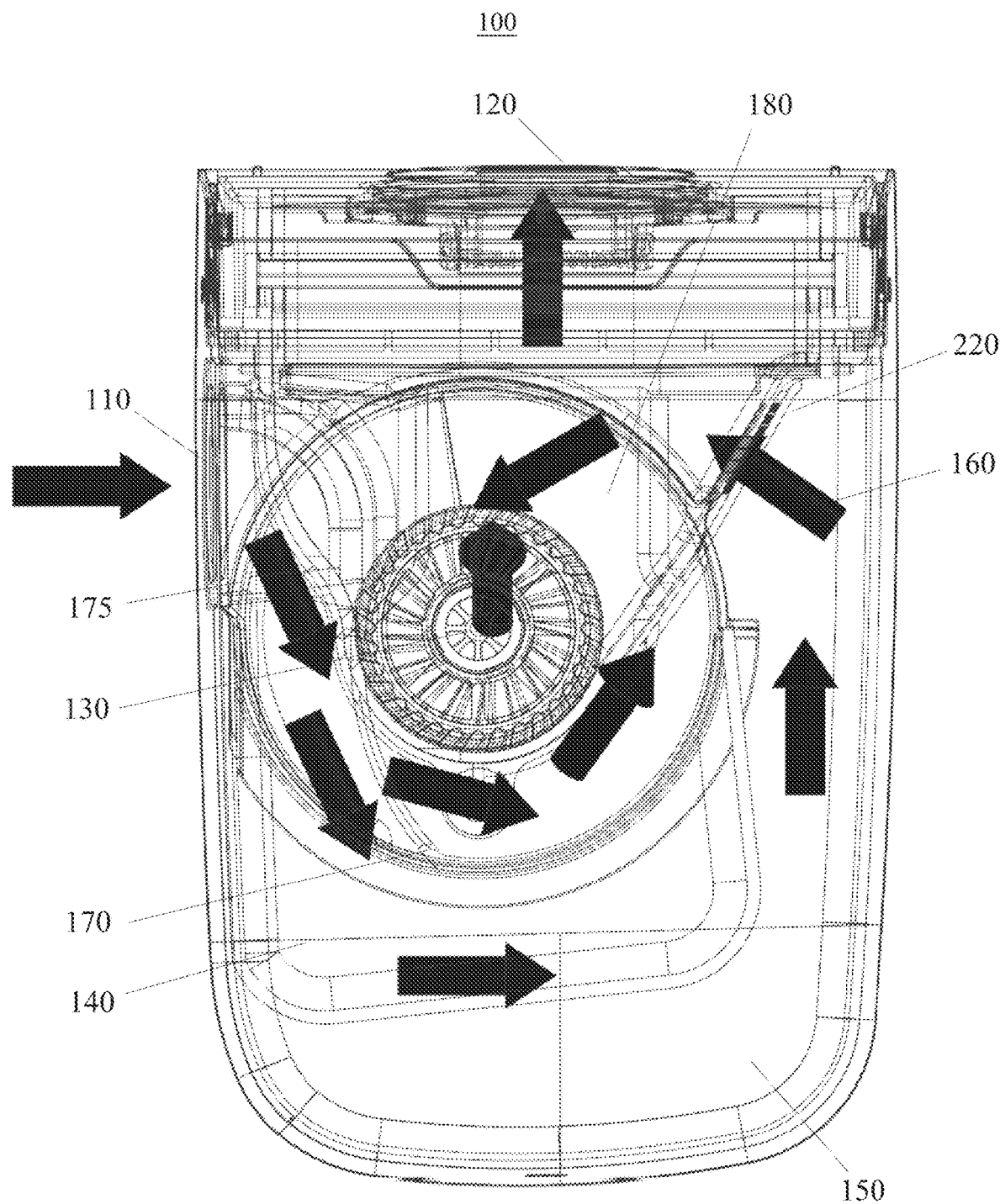
FIG. 1A shows a front view of a filament bypass cyclone separation system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate to filament bypass cyclone separation devices, systems and filters. In one embodiment, a cyclone filter includes an air cyclone generator, and a cyclone chamber connected to the air cyclone generator. The cyclone chamber includes a cyclone constriction path and a crossflow filter. A return path filter is connected externally to the cyclone chamber. A dust bin is connected externally to the cyclone chamber. The cyclone filter further includes a housing that forms a debris bin for the cyclone filter.

Cyclone filtration and separation systems and devices can be widely used in vacuum cleaners, such as canister type cleaning devices, up-right type cleaning devices, robotic cleaning devices, hand-held type cleaning devices, etc. Cyclone filtration and separation systems and devices include an inlet portion through which air is introduced and an outlet part through which air is discharged to the outside of the cyclone dust collecting device. The air introduced through the inlet portion may be discharged to the outside through the outlet portion after foreign substances included in the air are separated and filtered from the air. Cyclone filtration and separation systems and devices may further include one or more devices (e.g., fans, blowers, pumps, compressors, etc.) that may be disposed to be rotatable about a rotation shaft or otherwise for providing airflow in and out of the cyclone filtration and separation systems and devices.

Cyclone filtration and separation systems and devices function by admitting dirty airflow into a cyclone or cyclone chamber through a tangential inlet which causes the airflow to follow a spiral type path within the cyclone chamber, causing dirt and debris contained within the airflow to separate. This provides for the dirt to be collected and removed. The separated dirt and debris collect in a large debris bin or collection chamber connected to the air cyclone periphery. The large debris bin or dirt collection chamber may be transparent so that the user is able to view the amount of dirt and debris that has been collected. The user is then able to determine when it is necessary to empty the dirt collection chamber. The large debris bin or dirt collection chamber may not be entirely visible to the user. For example, cyclone filtration and separation systems and devices may be mounted within a main body of a vacuum cleaner such that part of the dirt collection chamber is obscured from view during normal use.

Air cyclone separation and filtration systems have problems in the instance of filament like bodies (e.g., hair or hair-like material, thread or thread-like material, string or string-like material, etc.), where the aspect ratio of the bodies is on the order of 100 or 1,000 times its smallest dimension. The behavior of filaments has been found to be very different from spherical particles, and the tendencies toward agglomeration add additional difficulty in the treatment of filament bodies as particles. This leads to significant clogging in conventional air cyclone systems with sharp turns, or small openings with strong pressure gradients across them as a portion of the filament completes a turn or enters an orifice, but the remainder of the filament under action from a different portion of the flow will move along a different flow path. The result is that filament bodies will often become caught in orifices or on edges in conventional systems. After some agglomeration of filaments in a conventional air cyclone separation and filtration system results in a severe degradation of the performance of the air cyclone through the collapse of the appropriate flow field. This is more pronounced when the length of the filament bodies is on the order of the diameter or height of the cyclone. The end result is that conventional air cyclones are often inadequate to handle the continuous aspiration of large quantities of filament bodies and will often clog rapidly when the solid media introduced has a large portion of filament bodies.

Figure 1B:
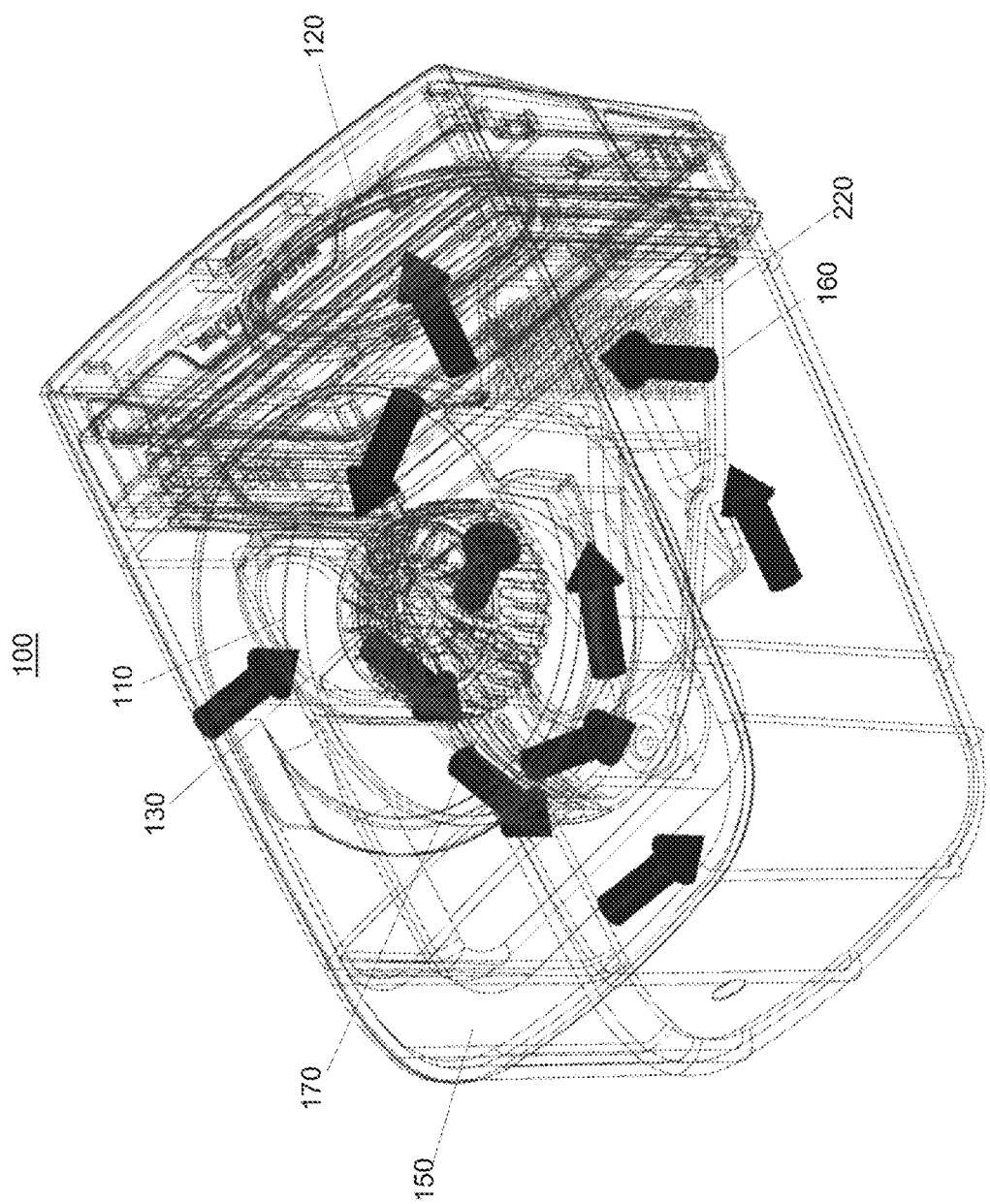
FIG. 1B shows a perspective view of the filament bypass cyclone separation system, according to some embodiments.

FIG. 1A shows a top view of a filament bypass cyclone separation system 100, and FIG. 1B shows a perspective view of the filament bypass cyclone separation system 100, according to some embodiments. In one or more embodiments, the filament bypass cyclone separation system 100 includes an enclosing structure which also acts as the large debris bin 150, an air cyclone 130, the dust bin 140 attached to the periphery of the air cyclone 130, a crossflow filter 170 between an inlet 110 and the air cyclone 130 air inlet, a crossflow filter bypass path from 110 to 150 adjacent and opposite the crossflow filter 170, a return path in direction of arrow 160, and return filter 220, which keeps large debris from exiting the large debris bin 150. In one or more embodiments, the airflow moves in the direction of the arrows through the inlet 110, through the crossflow filter 170, into the air cyclone (or air cyclone generator) 130, over the cyclone ramp 180, through the cyclone generator openings 210 and 211, and to the outlet 120; another airflow path flows in the direction of the arrows through the crossflow filter bypass opening 185 (FIGS. 3, 4A-B and 9A), into the large debris bin 150, and through the path in direction of arrow 160, passing through the return filter 220, and out through the outlet 120. One or more embodiments may be implemented in a compact vacuum cleaner system, a robotic vacuum system, or any gas filtration system for filtering airflows that contain a large amount of suspended solids, in which a significant portion of the solids are comprised of filament bodies.

Figure 8:
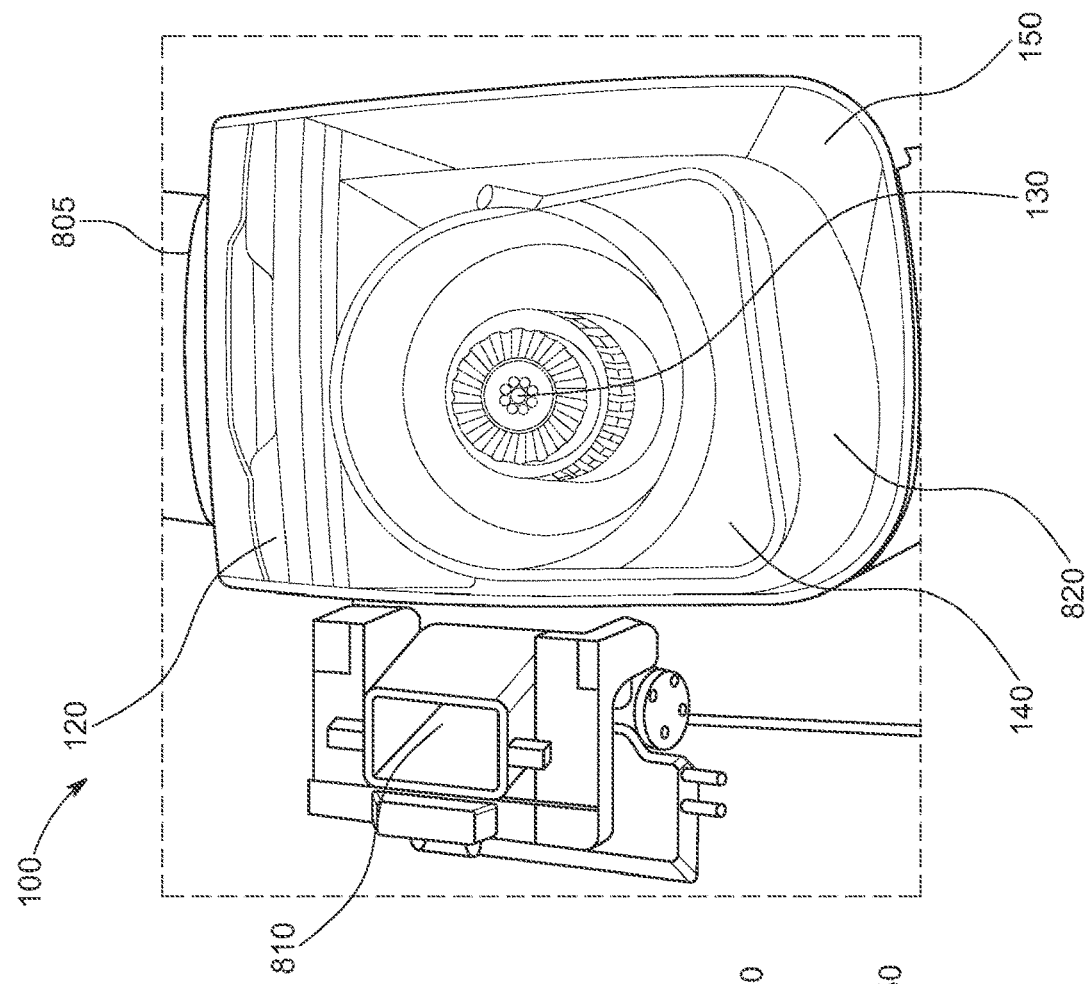
FIG. 8 shows filament material bypassed in a filament bypass cyclone separation system, according to some embodiments.

In some embodiments, the filament bypass cyclone separation system 100 works by creating a pressure difference between the inlet 110 and the outlet 120, which induces (e.g., where the airflow is induced by a vacuum motorized device 805, FIG. 8, such as a fan, pump, compressor, etc.) the working fluid, a gas, to move through the filament bypass cyclone separation system 100. The inlet 110 flow introduces an airflow including solid media, which brings with it filament bodies. The majority of the filament bodies will agglomerate in transit, and slide along the surface of the crossflow filter 170. The tangential curvature of the filament bypass cyclone separation system 100 ensures that agglomerations of filament bodies will not become lodged or caught in the crossflow filter 170, and will exit via the crossflow bypass opening 185 (FIGS. 3, 4A-B and 9A), and will instead be deposited in the large debris bin 150. The return path in the direction of arrow 160 ensures that there is a flow field which moves through the large debris bin 150 to continually move filament body agglomerations along the crossflow filter 170 face. This is an improvement over a conventional air cyclone as the filament bodies would otherwise become lodged in the cyclone generator (sets of) openings 210 and 211 (FIGS. 2, 5 and 6), and create an agglomeration inside these openings which would lead to a clogging of the flow paths, an increase in the resistance to the flow, and a decrease of the flow field speed (see, e.g., FIG. 7), which results in the collapse of the flow field, and a system which will no longer filters solids from the gas media.

In one or more embodiments, the crossflow bypass opening 185 provides for passing filament bodies to be deposited into the large debris bin 150. The smaller particles (e.g., dust, etc.) flow into the crossflow filter 170 and into the air cyclone 130, where they are deposited into the dust bin 140.

In one or more embodiments, in the filament bypass cyclone separation system 100 the pressure drop through the air cyclone 130 and the return path 160 are balanced. In one embodiment, the return path 920 (FIG. 9B) is included into the cyclone periphery to ensure the maximum possible velocity is developed in the air cyclone 130.

Figure 2:
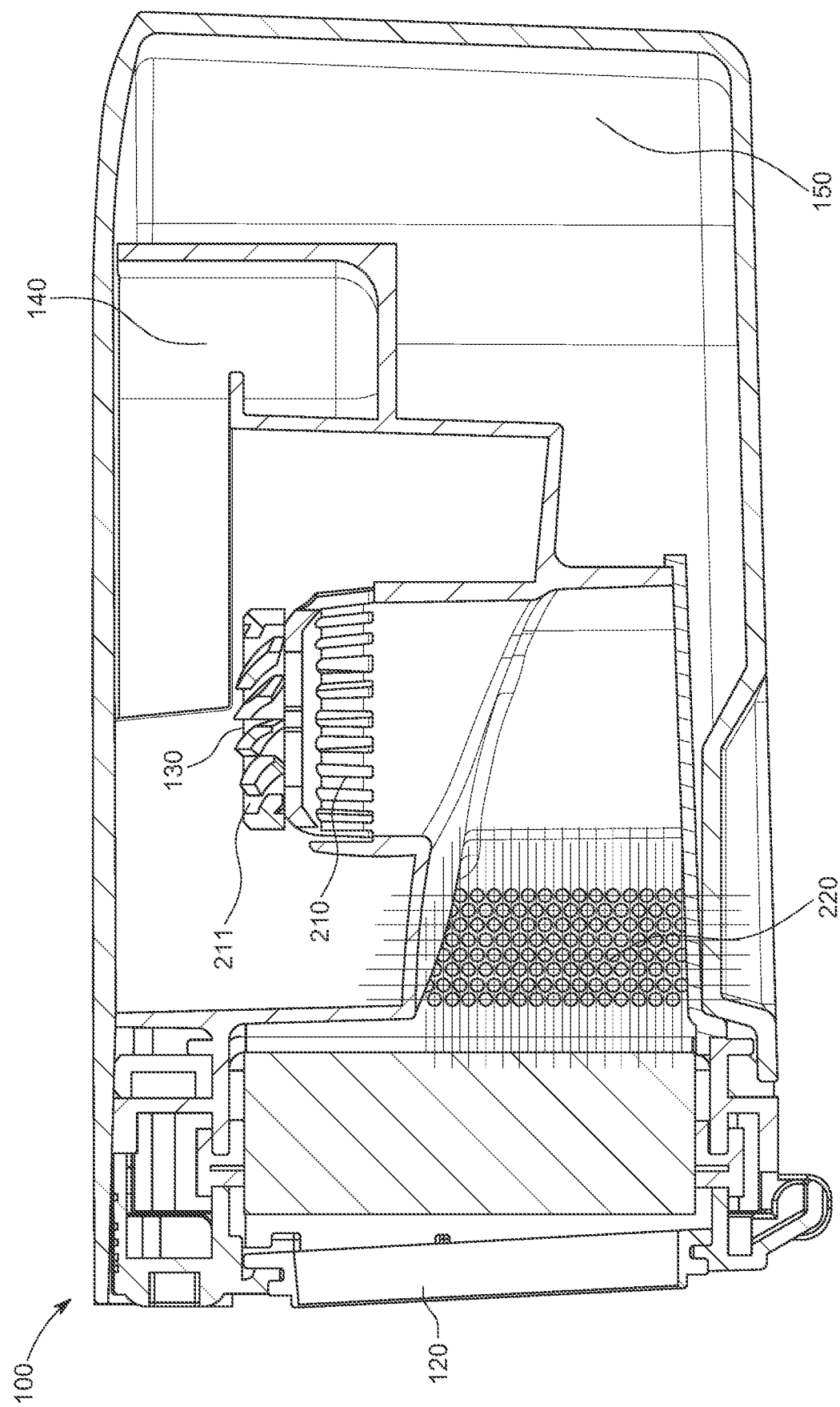
FIG. 2 shows a cross-sectional view of the filament bypass cyclone separation system, according to some embodiments.

FIG. 2 shows a cross-sectional view of the filament bypass cyclone separation system 100, according to some embodiments. In one or more embodiments, there are two flow paths, each having their own effective flow impedance. In one path, herein referred to as the main path, which passes through cyclone generator openings 210 and 211, the effective flow impedance is the sum of impedance through cross flow filter 170 plus the impedance through the cyclone generator openings 210 and 211 in the air cyclone 130. For the second path, which passes through the crossflow filter bypass opening 185 (FIGS. 3, 4A-B and 9A), the effective impedance is determined by the geometry of the size and spacing of the openings of the return filter 220 in the return path shown by the arrow 160, and the size of the crossflow filter bypass opening 185, itself.

Figure 3:
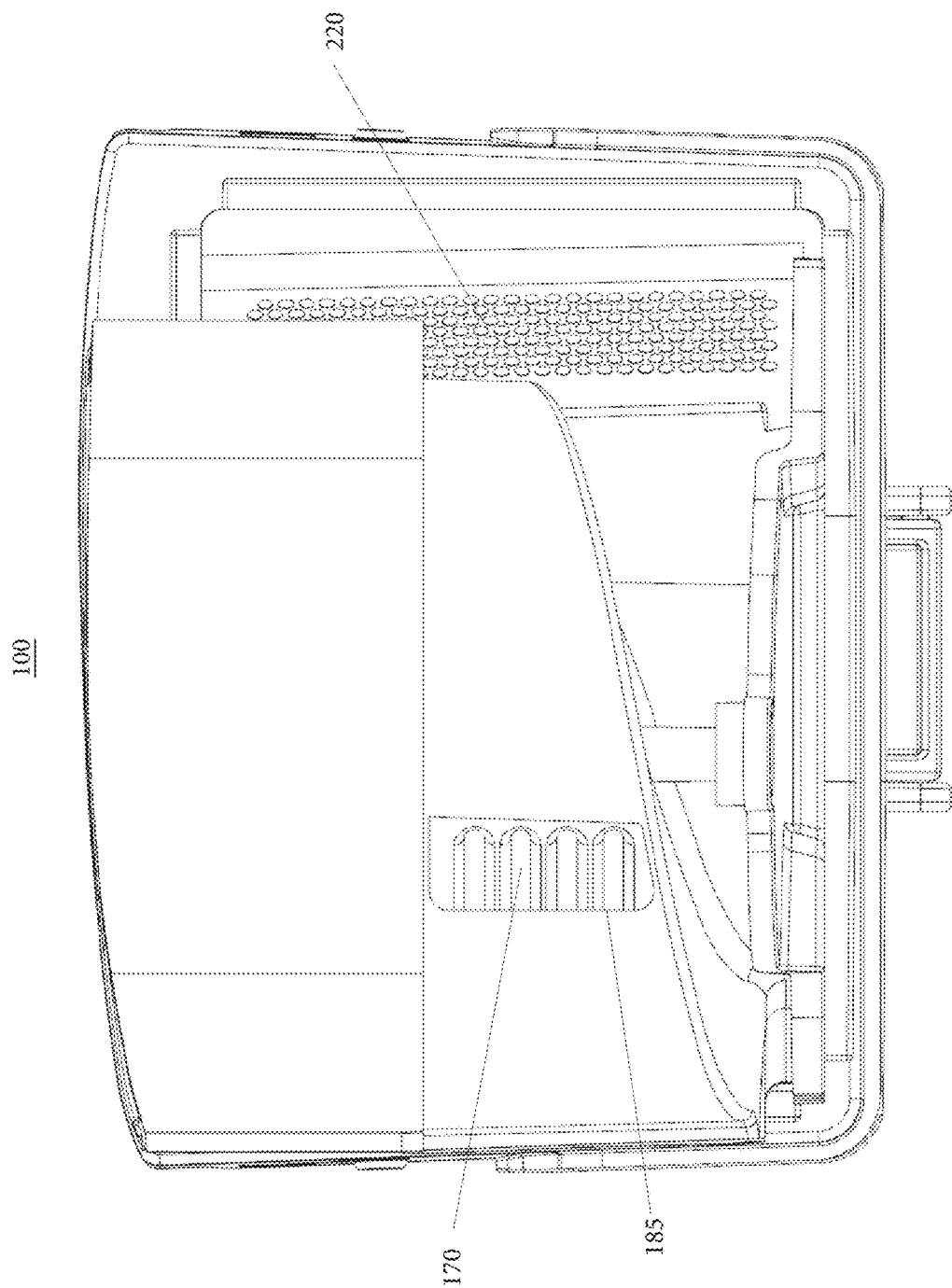
FIG. 3 shows a side view of the filament bypass cyclone separation system, according to some embodiments.

FIG. 3 shows a side view of the filament bypass cyclone separation system 100, according to some embodiments. In one or more embodiments, the pressure balance between the two paths (through the cyclone generator openings 210 and 211 of the air cyclone 130, and through the crossflow filter bypass opening 185) is achieved by the higher normalized surface area of the return path in the direction of arrow 160 (FIGS. 1A-B) opening area (size and spacing of the openings of the return filter 220) to the combined restriction created by the crossflow filter 170 slots or openings and the cyclone openings 210 and 211. The increased surface area of the smaller holes in the return filter 220 results in an increase of the skin friction losses, thus decrease in the flow, creating a slightly more favorable pressure gradient through the crossflow filter 170 slots or openings.

Figure 4A:
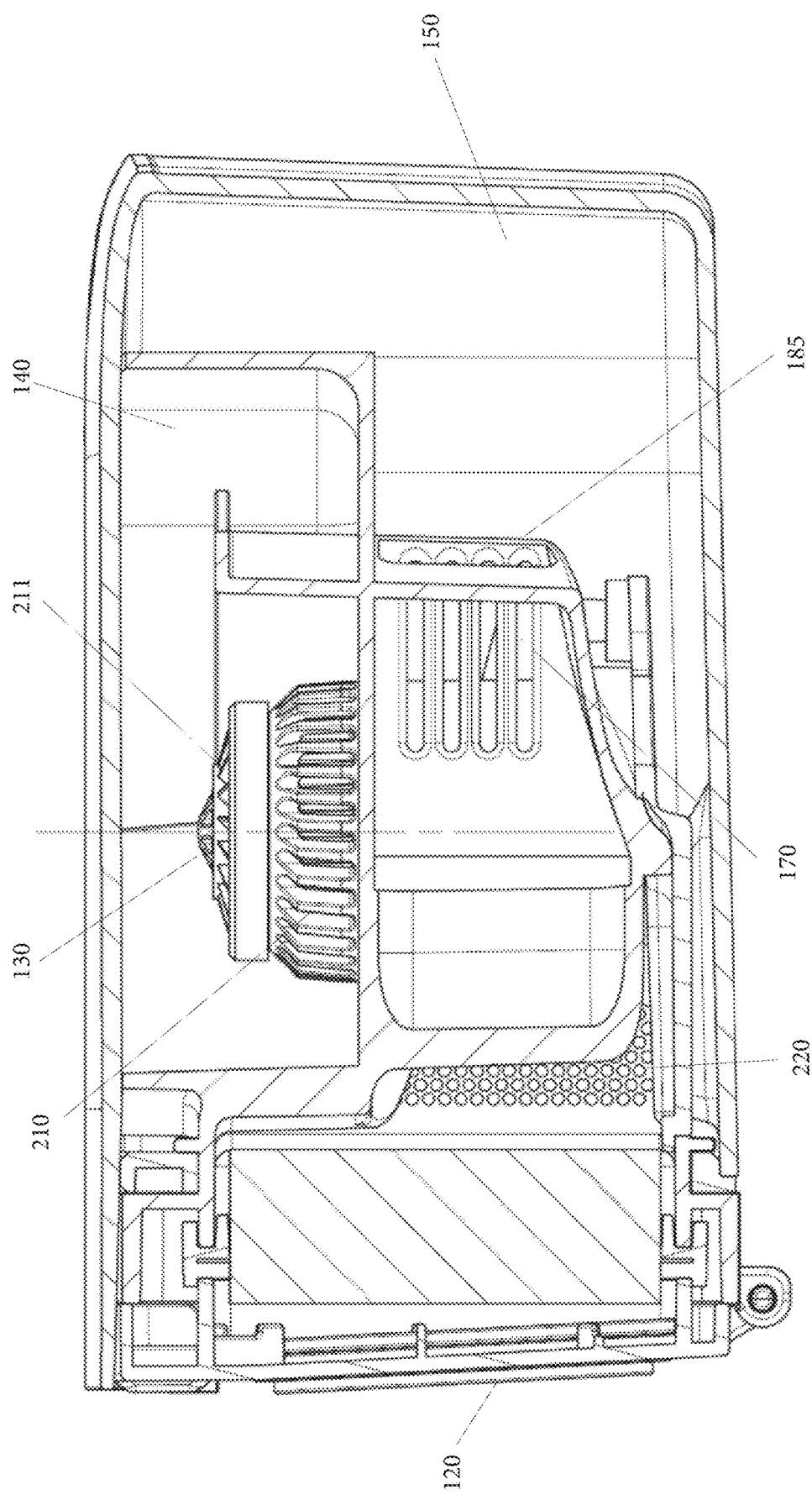
FIG. 4A shows a side cross-sectional view of the filament bypass cyclone separation system, according to some embodiments.
Figure 4B:
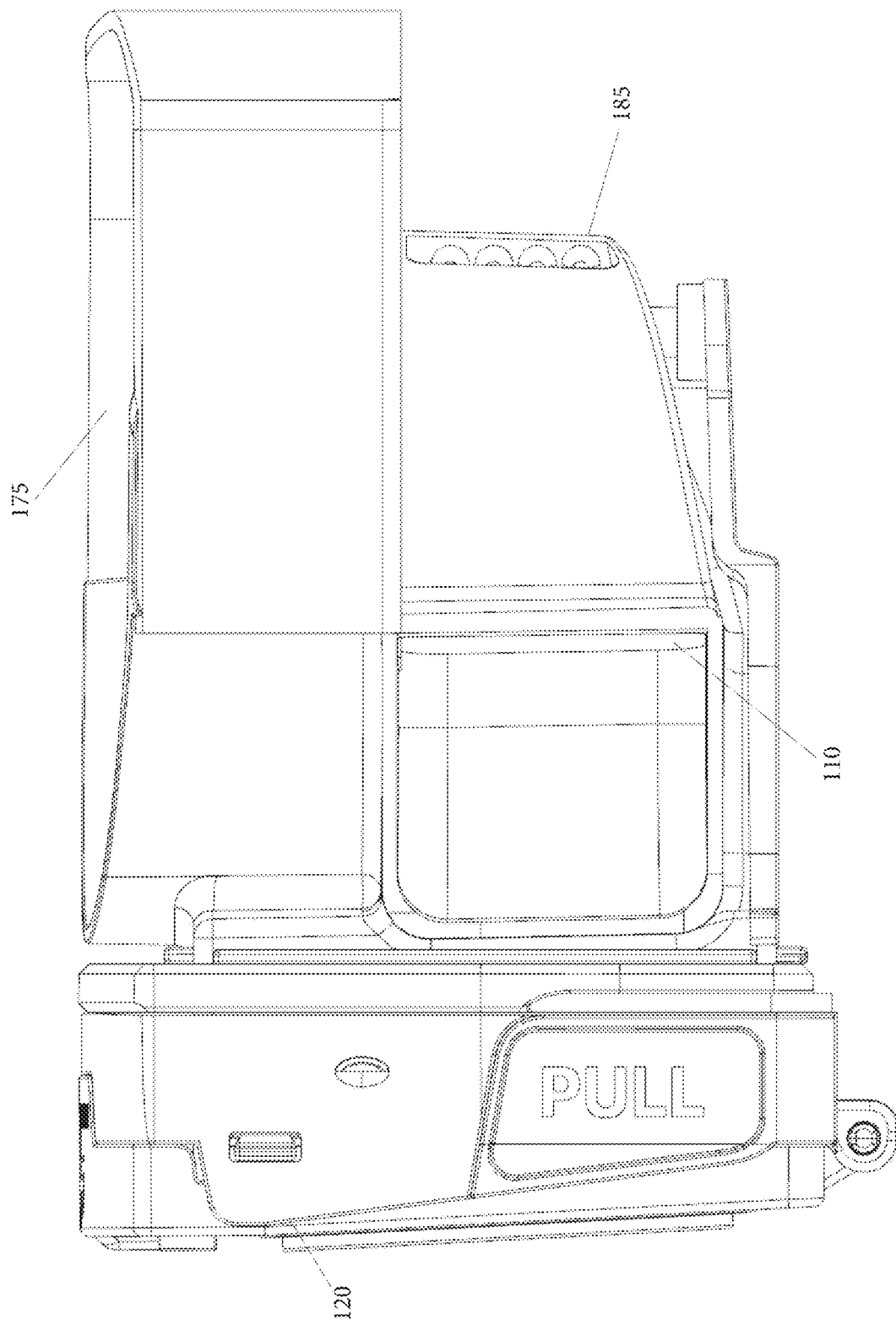
FIG. 4B shows a side view of the filament bypass cyclone separation system, according to some embodiments.

FIG. 4A shows a side cross-sectional front view of the filament bypass cyclone separation system 100, and HG. 4B shows a side view of the filament bypass cyclone separation system 100, according to some embodiments. In one or more embodiments, the slots, openings, perforations, etc. of the crossflow filter 170 reflect roughly half the nominal size of filament agglomeration body, the specific size of which is experimentally determined from the specific mechanical properties of the filament body media to be filtered, in one example embodiment, a grate surface of the crossflow filter 170 is designed to have a constant parabolic surface curvature and a constant parabolic opening curvature, meaning that the net force on any suspended particle that cannot enter a slot or opening results in the particle sliding along the surface of crossflow filter 170, through the crossflow filter bypass opening 185, and into the large debris bin 150. It would not be possible for example, for small pieces of paper or other flat sheet types of material, to become lodged over the crossflow filter 170 slots or openings that may form a grate. Either the particle will slide across and off the grate, through the crossflow filter bypass opening 185 and into the large debris bin 150, or the particle will deform and enter the air cyclone 130.

Figure 5:
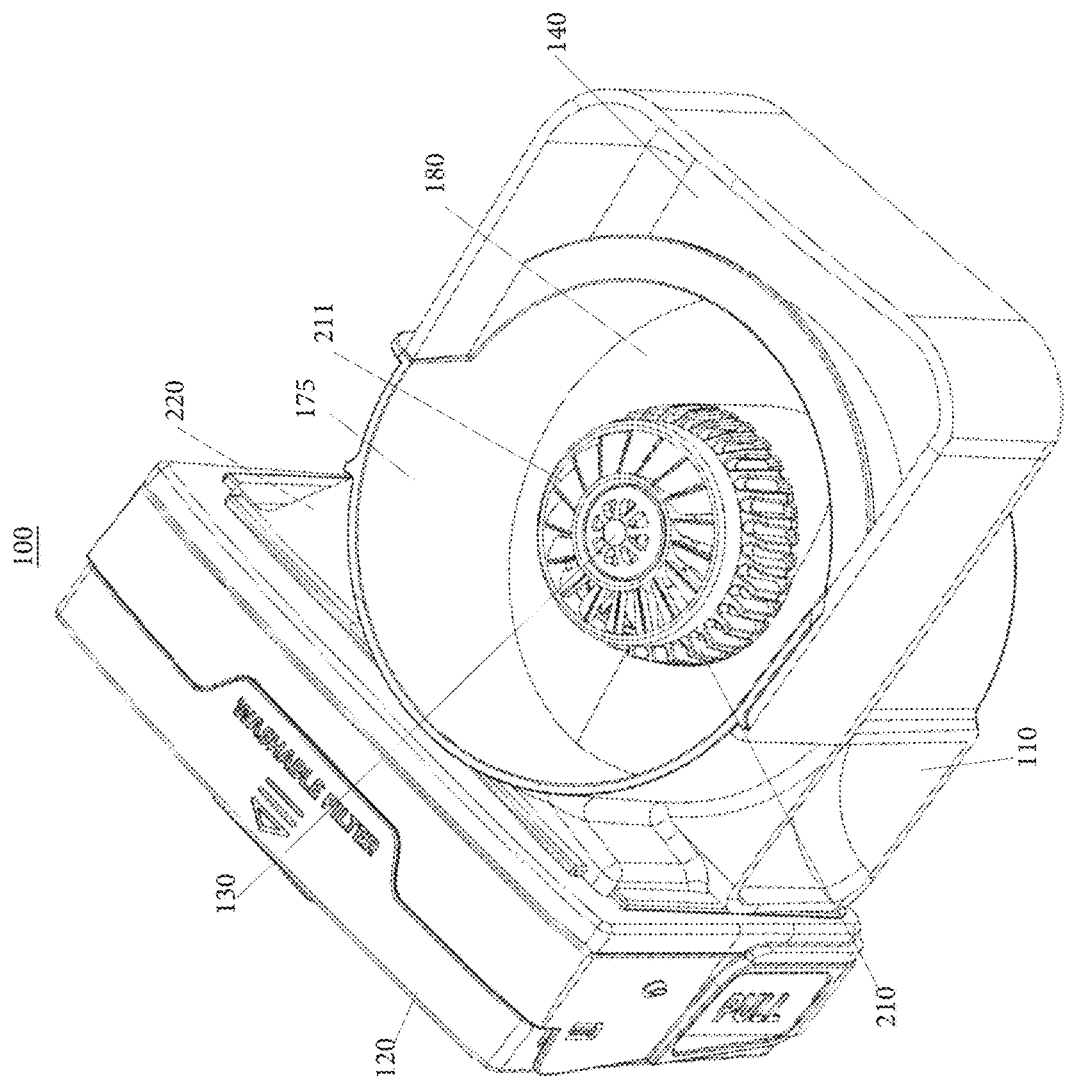
FIG. 5 shows a top right-side perspective view of the filament bypass cyclone separation system, according to some embodiments.

FIG. 5 shows a top right-side perspective view of the filament bypass cyclone separation system 100, according to some embodiments. Smaller dust particles will gather in the dust bin 140. In one or more embodiments, the filament bodies slide across the surface over the crossflow filter 170 (see, e.g., FIG. 6), through the crossflow filter bypass opening 185 (FIGS. 3, 4A-B and 9A) and into the large debris bin 150. In one or more embodiments, the cyclone constriction path 180 has a sloped surface configured to accelerate the flow of particles separated from forced air that enters the air cyclone 130.

Figure 6:
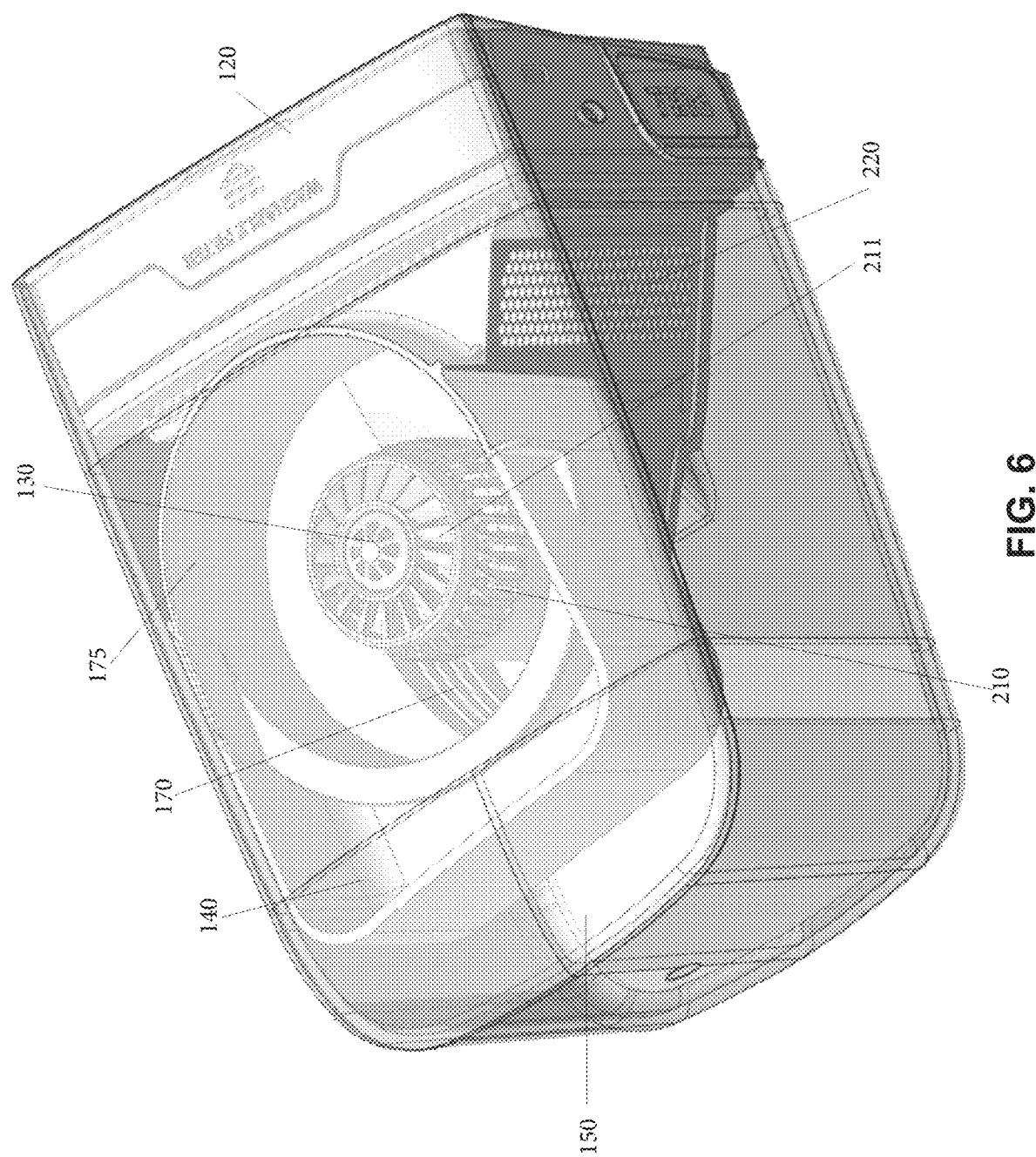
FIG. 6 shows a back-right-side perspective view of the filament bypass cyclone separation system, according to some embodiments.

FIG. 6 shows a top back-right-side perspective view of the filament bypass cyclone separation system 100, according to some embodiments. In one or more embodiments, the ballistic coefficient of collected debris and the nominal length scale determines where debris gets deposited. Small, highly ballistic debris will be deposited into the dust bin 140. Small, low ballistic debris passes into a blower filter fore chamber. All materials larger than the grate openings of the crossflow filter 170 are deposited in the large debris bin 150 regardless of ballistic coefficient. The large debris bin 150 may be made of a transparent or an opaque material. In one embodiment, the airflow follows the direction of the arrows through the return path filter 220, which prevents debris from exiting the large debris bin.

In one or more embodiments, the filament bypass cyclone separation system 100 may have one or more components manufactured via injection molding, or similar processes. One or more components of the filament bypass cyclone separation system 100 may be made of plastic material, thermoplastics (e.g., acrylonitrile butadiene styrene (ABS)), anti-static resin, etc. The filament bypass cyclone separation system 100 may be sized appropriately depending on the implementation (e.g., sized for implementation in a hand-held vacuum device, a robotic vacuum device, an upright vacuum device, etc.).

Figure 7:
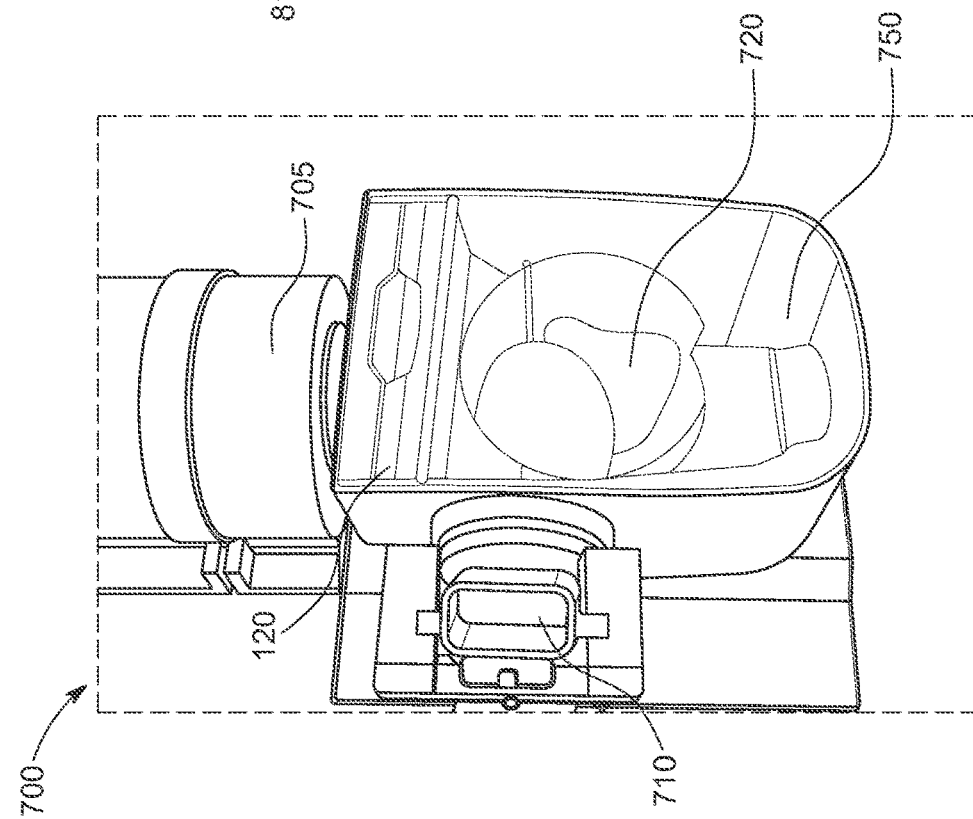
FIG. 7 shows a filament-clogged example of a conventional cyclone filtration system.

FIG. 7 shows a filament-clogged example of a conventional cyclone filtration system 700. Filament material 720 (e.g., pet hair/fur) included in an airflow enters through the airflow inlet 710 (where the airflow is induced by the vacuum motorized device 705, such as a fan, pump, compressor, etc.) and the conventional air cyclone attempts to separate the filament material 720 from the airflow. The filament material 720 cannot escape into the large debris bin 750 and clogs the air cyclone. In one example, the filament material 720 is about less than 100 cc of lightly compacted dog hair material.

FIG. 8 shows filament material 820 bypassed in the filament bypass cyclone separation system 100, according to some embodiments. Filament material 820 (e.g., pet hair/fur) included in an airflow that enters through the airflow inlet 810 (where the airflow is induced by the vacuum motorized device 805, such as a fan, pump, compressor, etc.) and the air cyclone 130 attempts to separate the filament material 820 from the air. The filament material 820 escapes through the crossflow filter bypass opening 185 (FIGS. 3, 4A-B and 9A) into the large debris bin 150. In one example, the filament material 820 is greater than 500 cc of lightly compacted dog hair material.

Figure 9A:
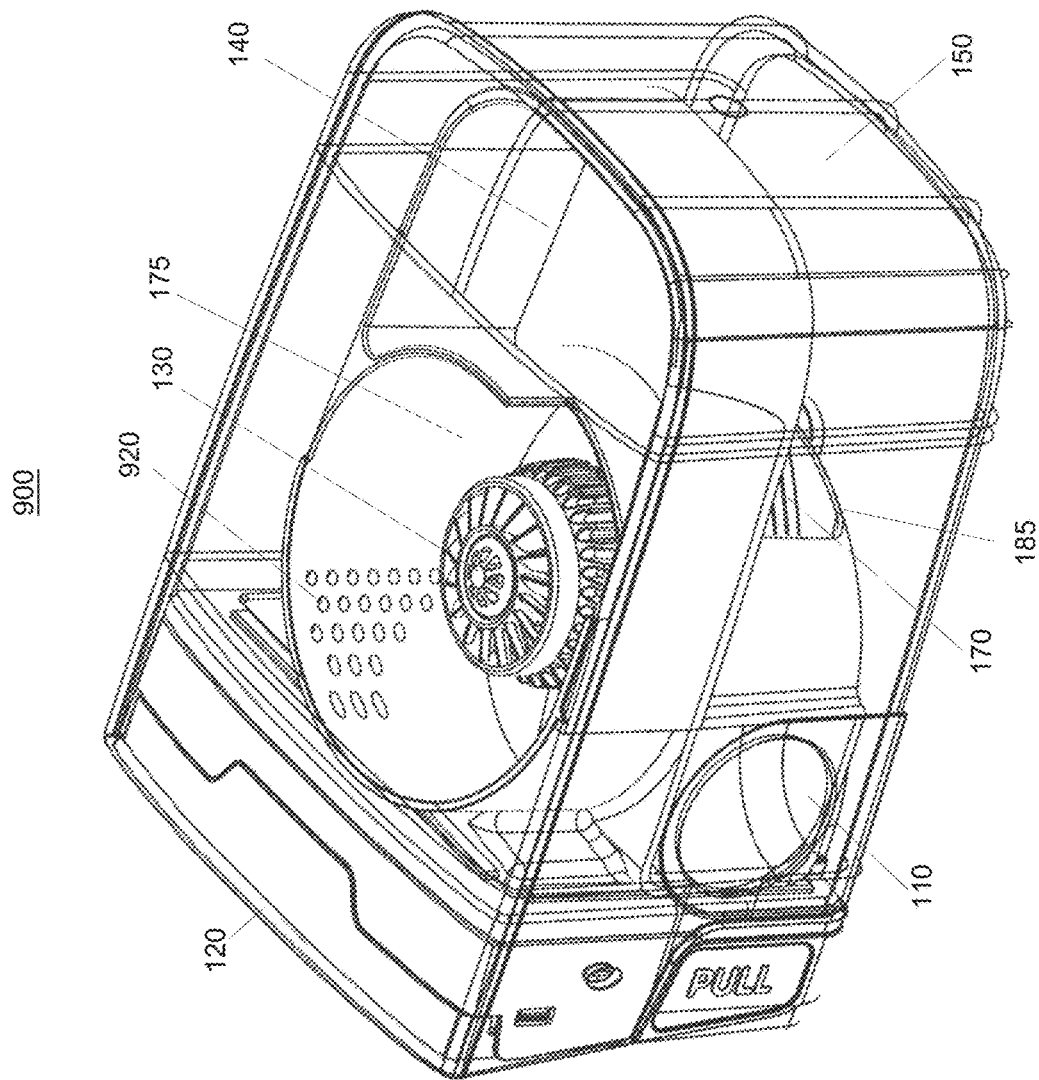
FIG. 9A shows a front-right top perspective view of another filament bypass cyclone separation system, according to some embodiments.
Figure 9B:
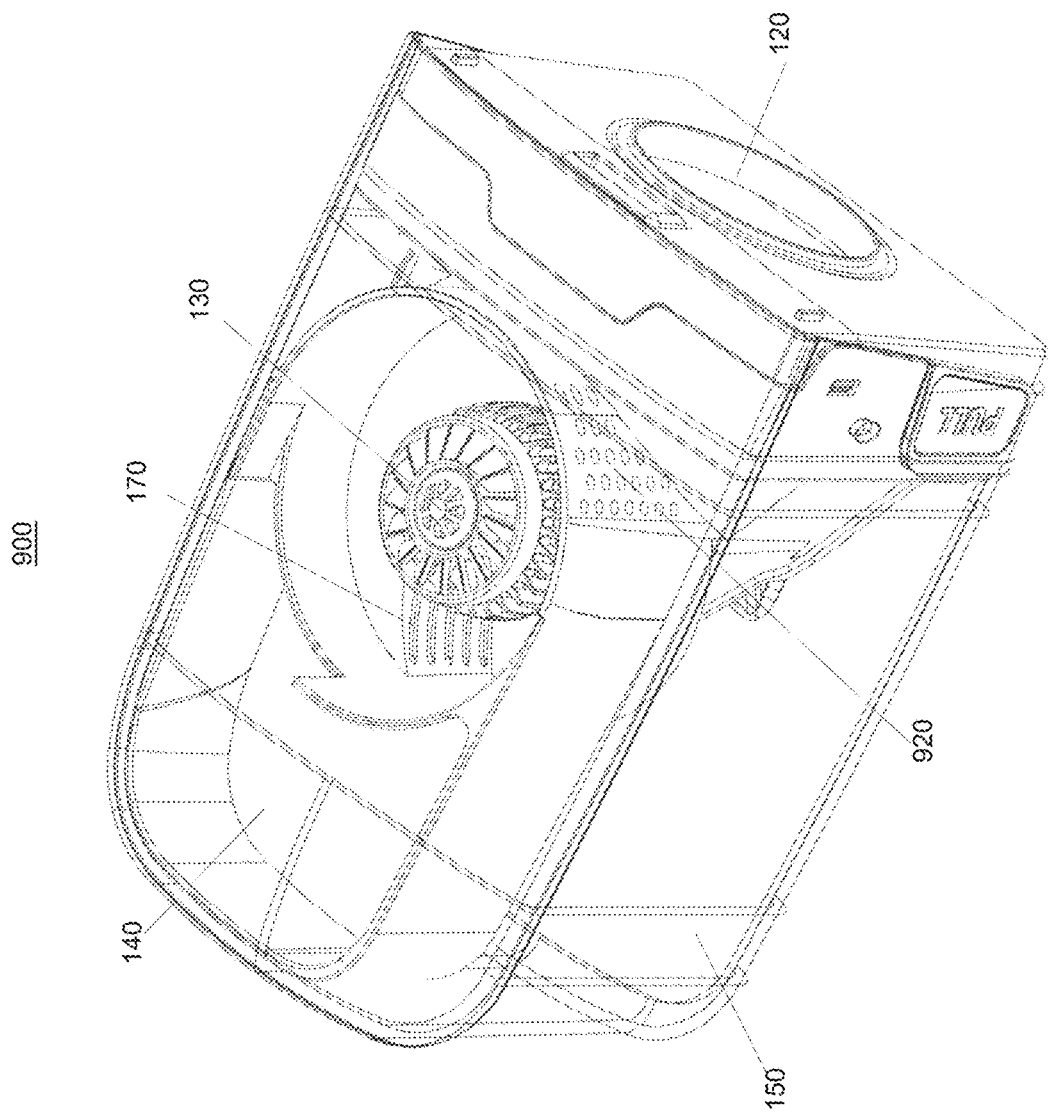
FIG. 9B shows a back-right top perspective view of the filament bypass cyclone separation system of FIG. 9A, according to some embodiments.

FIG. 9A shows a front-right top perspective view of another filament bypass cyclone separation system 900, according to some embodiments. FIG. 9B shows a back-right top perspective view of the filament bypass cyclone separation system 900 of FIG. 9A, according to some embodiments. In one or more embodiments, the filament bypass cyclone separation system 900 includes return path filter 920 as part of the cyclone chamber 175. The openings of the return path filter 920 may be circular, oval, slotted, etc. The airflow path from the return path filter 920 travels through the cyclone 130 to reach the outlet 120. This airflow path is different from the airflow path in the direction of arrow 160 (FIGS. 1A-B), which travels directly to the outlet 120. In one or more embodiments, the induced air that passes the cross flow filter 170 with large debris still returns through the cyclone 130, increasing the flow velocity in the cyclone 130. All of the air traveling through the filament bypass cyclone separation system 900 travels through the cyclone 130; the air comes in through the inlet 110, then some of the air passes through the cross flow filter 170 into the cyclone 130, and the rest of the air passes through the crossflow filter bypass opening 185, and into the large debris bin 150, and onto the return path filter 920. The splitting of the airflow is meant to drive larger particles out to the large debris bin 150, where the airflow is then expanded and decelerated, which then travels to the return path filter 920, where it is then accelerated again through the openings of the return path filter 920.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though embodiments have been described with reference to certain versions thereof; however, other versions are possible. Therefore, the spirit and scope of the embodiments should not be limited to the description of the preferred versions contained herein.

What is claimed is:

1. A cyclone filter comprising:
an air cyclone generator;
a cyclone chamber coupled to the air cyclone generator, the cyclone chamber comprising:
a cyclone constriction path; and
a crossflow filter comprising a grate structure with a parabolic surface curvature; and
a return path portion coupled externally to the cyclone chamber.

2. The cyclone filter of claim 1, further comprising:
a dust bin coupled externally to the cyclone chamber;
a housing that forms a debris bin for the crossflow filter;
an inlet coupled to the air cyclone generator; and
an outlet coupled to the housing,
wherein the inlet provides an air path to enter the air cyclone filter and the outlet provides an air path to exit the air cyclone filter.

3. The cyclone filter of claim 2, wherein the return path portion comprises a return path filter that is configured to filter debris from airflow exiting the debris bin through the return path filter.

4. The cyclone filter of claim 2, wherein the crossflow filter guides filament material to enter the debris bin.

5. The cyclone filter of claim 2, wherein the cyclone constriction path accelerates flow of particles separated from the forced air.

6. The cyclone filter of claim 2, wherein the crossflow filter comprises a slotted surface.

7. The cyclone filter of claim 6, wherein slots from the slotted surface of the crossflow filter form the grate structure, and the parabolic surface curvature is a constant parabolic surface curvature such that a net force on any suspended particle unable to pass through one of the slots guides the particle to slide along a surface of the crossflow filter surface and into the debris bin.

8. The cyclone filter of claim 2, wherein the cyclone filter is configured to couple with a motorized vacuum device.

9. A cyclone device comprising:
an air cyclone generator comprising at least two sets of openings;
a cyclone chamber coupled to the air cyclone generator, the cyclone chamber comprising:
a cyclone constriction path;
a crossflow filter comprising a grate structure with a parabolic opening curvature; and
a cyclone exterior barrier.

10. The cyclone device of claim 9, further comprising:
a dust bin coupled externally to the cyclone chamber, the dust bin positioned to collect dust particles that flow over the cyclone exterior barrier;
a housing that forms a debris bin for the cyclone device;
a return path portion coupled externally to the cyclone chamber;
an inlet coupled to the air cyclone generator; and
an outlet coupled to the housing,
wherein the inlet provides an air path to enter the air cyclone generator and the outlet provides an air path to exit the cyclone device.

11. The cyclone device of claim 10, wherein the return path portion comprises a return path filter that is configured to filter debris from airflow exiting the debris bin through the return path filter.

12. The cyclone device of claim 10, wherein the crossflow filter guides filament material to enter the debris bin.

13. The cyclone device of claim 10, wherein the cyclone constriction path accelerates flow of air.

14. The cyclone device of claim 10, wherein the return path portion comprises a perforated surface.

15. The cyclone device of claim 14, wherein slots of the crossflow filter form the grate structure, and the parabolic opening curvature is a constant parabolic opening curvature such that a net force on any suspended particle unable to pass through one of the slots guides the particle to slide along a surface of the cyclone chamber and into the debris bin.

16. The cyclone device of claim 10, wherein the cyclone device is configured to couple with a motorized vacuum device.

17. A method for filtering filament particles with a cyclone filter, the method comprising:
forming a cyclone airflow within a cyclone chamber of the cyclone filter;
moving, with the cyclone airflow, filament particles through a crossflow filter bypass opening; and
filtering the filament particles from the cyclone airflow using a crossflow filter comprising a grate structure with a parabolic opening curvature within the cyclone chamber.

18. The method of claim 17, further comprising:
guiding the filtered filament particles that enter the crossflow filter into a debris bin of the cyclone filter.

19. The method of claim 17, further comprising:
preventing debris including the filament particles from exiting the debris bin using a return path filter of the cyclone chamber.

20. The method of claim 17, wherein:
increasing surface area of slots of the crossflow filter and openings of the return path portion decreases the cyclone airflow and creates a pressure gradient through the slots; and
the slots form the grate structure, and the parabolic opening curvature is a constant parabolic opening curvature such that a net force on any suspended particle unable to pass through one of the slots guides the particle to slide along a surface of the cyclone chamber and into the debris bin.

* * * * *